E. SACHS.
COASTER BRAKE FASTENER.
APPLICATION FILED JAN. 24, 1912.

1,045,194.

Patented Nov. 26, 1912.

2 SHEETS—SHEET 1.

Witnesses

Inventor
Ernst Sachs
By Julius A. Dowell
Attorney

E. SACHS.
COASTER BRAKE FASTENER.
APPLICATION FILED JAN. 24, 1912.
1,045,194.
Patented Nov. 26, 1912.
2 SHEETS—SHEET 2.
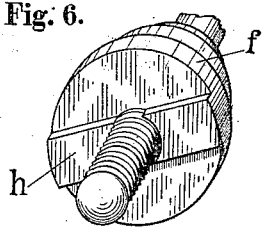
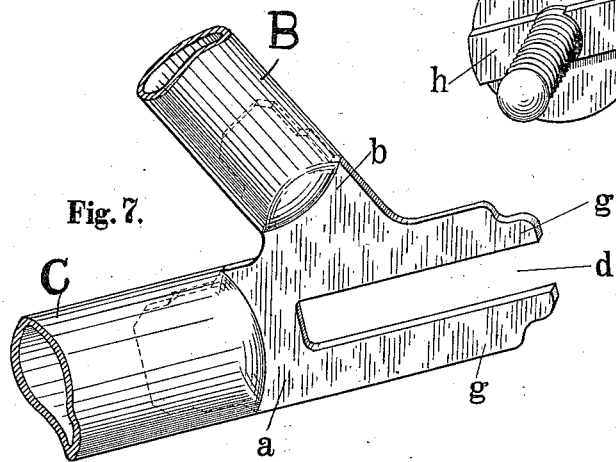
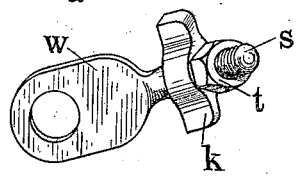
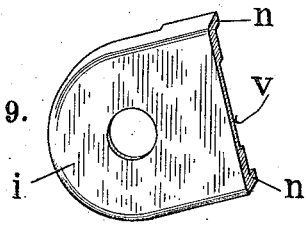
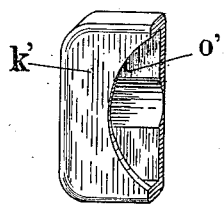
Witnesses
Inventor

UNITED STATES PATENT OFFICE.

ERNST SACHS, OF SCHWEINFURT, GERMANY.

COASTER-BRAKE FASTENER.

1,045,194.      Specification of Letters Patent.      Patented Nov. 26, 1912.

Application filed January 24, 1912. Serial No. 673,073.

*To all whom it may concern:*

Be it known that I, ERNST SACHS, a subject of the King of Bavaria, residing at No. 23 Schultesstrasse, Schweinfurt, in Germany, have invented a new and useful Coaster-Brake Fastener, of which the following is a specification.

This invention relates to a special appliance by means of which a member of a back-pedaling brake mechanism can be fixed non-rotatably to the cycle frame in an easy and effective manner.

The object of the invention is to so construct the improved connecting appliance that the deformation or rupture of the adjacent and engaged parts of the cycle frame is prevented even under high forces acting in the brake mechanism and transmitted to the cycle frame by the connecting means. This object is attained by the provision of a projection adapted to be secured at the end of the brake member, which projection engages into the longitudinal slot of the slotted bracket of the rear wheel fork in the well known manner; in connection with this fastening projection a special member is used for the purpose of securing the limbs of the slotted bracket against being bent inwardly or outwardly. To this end the said member is shaped so as to embrace the limbs at their outer opposite edges. It is further essential that the said securing member should be a part of the usual device, serving for adjusting or fixing the axle of the rear wheel in a desired position on the cycle frame. This appliance has the same advantages possessed by a rear wheel hub provided with the fork of the cycle and dispenses with the securing lever hitherto used. Furthermore the eye receiving the axle is not required to have a special form but is capable of engagement with the securing appliance.

In the drawings which form a part of this specification two structural forms of the mechanism are illustrated by way of example.

Figure 1:
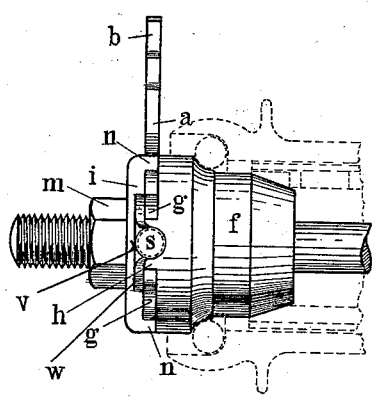
Figure 3:
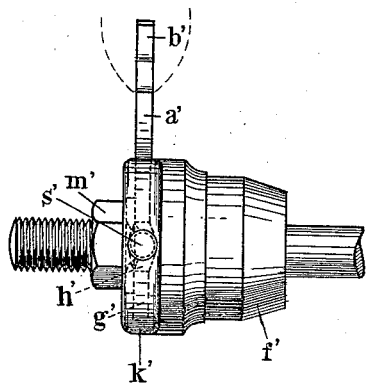
Figure 2:
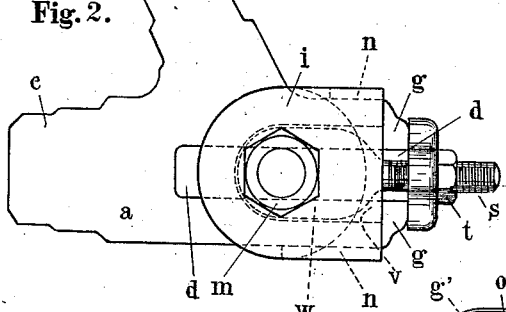
Figure 4:
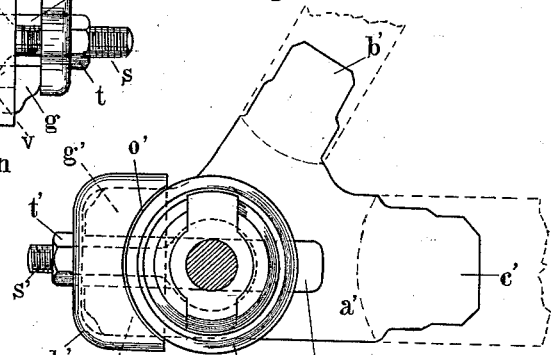
Figure 5:
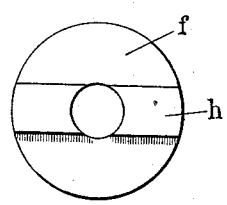

Figure 1 is an elevation of the appliance shown in connection with a brake member as secured to the slotted bracket of the rear fork of a cycle, all parts being represented as seen when looking from the rear of the cycle; Fig. 2 is a side elevation illustrating the outer side of the slotted bracket and the parts attached thereto; Figs. 3 and 4 are a rear view and an elevation of the inner side of another construction, respectively; Fig. 5 is an inner end view of the brake member which is adapted to be engaged with the inner side of the slotted bracket. Fig. 6 is a detail perspective view of the brake member mounted on its shaft; Fig. 7 is a detail perspective view of the eye, showing it engaged with the rear fork tubes of the cycle frame; and Figs. 8, 9 and 10 are detail perspective views of the chain tightening screw, the fork straddling disk and the modified form of fork-end engaging cap, respectively.

Like letters of reference designate like parts throughout all figures of the drawing.

The flat piece $a$ forming the slotted bracket of the rear fork bracket is secured in known manner with its two arms $b$ and $c$ in the rear fork tubes B and C of the cycle frame, as illustrated by dotted lines in Figs. 3 and 4 and in solid lines in Fig. 7. Said bracket has the usual form and is provided with a longitudinal slot $d$. The brake member $f$ to be non-revolubly secured is, as represented, a cone adapted to expand a brake sleeve, as shown in Fig. 1 by dotted lines, which cone is screwed on the axle. This form of the brake member is, however, not essential, and a member of any other form in accordance with the particular construction of the brake may be secured by means of the securing appliance of the present invention. A projection $h$ is formed on the outer end of the brake member and provided with parallel side faces which lie closely against the inner edges of the limbs $g$ of the slotted bracket, so as to fill as exactly as possible the width of the slot $d$.

Referring now more particularly to Figs. 1 and 2, a disk $i$ is provided on the other side of the slotted bracket $a$ and serves as a washer for the nut $m$ screwed on the axle. The said disk is provided with projections $n$ directed toward the brake member $f$ and fitting closely over the outer opposite edges of the limbs $g$, thereby maintaining the limbs in their position, when the projection $h$ tends to move the limbs apart under the influence of a turning force acting upon the brake member $f$. The disk $i$ is further provided on the side adjacent to the slotted bracket $a$ with a shallow recess $v$ for receiving the eye or perforated disk $w$ of the screw $s$ which is disposed for tightening the chain by means of a nut $t$, bearing upon the cap $k$ which abuts against the end of the eye, or the disk *i* may be rigidly connected with the slotted bracket *w* of the screw *s*.

Referring to the modification illustrated in Figs. 3 and 4, the cap *k'* which serves as abutment for the nut *t'*, on the bolt *s'*, is so formed as to inclose completely the ends of the limbs *g'* of the slotted bracket *a'* and prevent the limbs from being forced apart or twisted laterally by the action of the forces operating upon their inner edges through the projection *h'* of the brake member *f'*. This cap *k'* is provided on the side adjacent to the brake member *f'* with a recess *o'* to enable the axle of the rear wheel to be adjusted by displacement in the slot *d'*. Thus the device for maintaining the limbs of the slotted bracket in shape forms a part of the device for tightening the chain, whereby the whole arrangement is simplified. In addition to the fact that it is adapted to be secured to the hub of an ordinary cycle, the new arrangement has the important advantage that no parts increasing the cost of the construction need be employed in place of the brake arm, but that on the contrary the securing of the brake member is effected by simple means combined with the existing parts or formed upon these parts.

What I claim as my invention, and desire to secure by Letters Patent, is—

1. In a device for non-rotatably securing a member of a coaster brake to a cycle frame, the combination with a slotted bracket on the rear fork of the cycle, of a brake member having a number of projections capable of engaging in the slot of said bracket, means for securing the coaster brake to said bracket, and means provided on said securing means and adapted to embrace the outer opposite edges of the bracket.

2. In a device for non-rotatably securing a free-wheel hub with coaster brake to a cycle frame, the combination with a slotted bracket provided on the rear fork of the cycle, said bracket having a longitudinal slot receiving the axle of the hub, of a brake member having a number of projections adapted to engage in the slot of the bracket, means for fixing the axle in the bracket, and means provided on said fixing means and adapted to embrace the outer opposite edges of the bracket.

3. In a device for non-rotatably securing a free-wheel hub with coaster brake to a cycle frame, the combination with a slotted bracket provided on the rear fork of the cycle, said bracket having a longitudinal slot, of a brake member having a number of projections, an axle of the free-wheel hub bearing the brake member, the said axle and projections being adapted to engage in the slot of the bracket, means for fixing and adjusting the axle in the slot of the bracket, and means provided on said fixing and adjusting means and adapted to embrace the outer opposite edges of the bracket.

4. In a device for non-rotatably securing a free-wheel hub with coaster brake to a cycle frame, the combination with a slotted bracket provided on the rear fork of the cycle, said bracket having a longitudinal slot, of a brake member having a number of projections, an axle bearing the brake member, the said projections and axle being mounted to slide in the slot of the bracket, a chain-tightening device capable of adjusting and securing the free-wheel hub in the slot of the bracket, and means capable of embracing the outer opposite edges of the bracket, said means being provided on the chain tightening device.

5. In a device for non-rotatably securing a free-wheel hub with coaster brake to a cycle frame, the combination with a fork-shaped bracket provided on the cycle, of a brake member having a number of projections adapted to be engaged in the fork of said bracket, a chain-tightening device, and an abutment cap of the chain-tightening device, which cap is adapted to embrace the opposite edges of the limbs of the forked bracket.

6. In a device for non-rotatably securing a free-wheel hub with coaster brake to a cycle frame, the combination with a slotted bracket provided on the rear fork of the cycle, said bracket having a longitudinal slot receiving the axle of the hub, of a brake member having a pair of projections adapted to engage in the slot of the bracket, one of said projections being arranged at each side of the axle, means for securing the axle to the bracket, and means provided on said securing means and adapted to embrace the outer opposite edges of the bracket.

7. In a device for non-rotatably securing a member of a coaster brake to a cycle frame, the combination with a slotted bracket on the rear fork of the cycle, of a brake member having a projection capable of engaging in the slot of said bracket, means for securing the coaster brake to said bracket, and means provided on said securing means and adapted to embrace the outer opposite edges of the bracket.

In testimony whereof I have signed my name to this specification in the presence of two subscribing witnesses.

ERNST SACHS.

Witnesses:
RICHARD TOIGSLANDER,
RUDOLPH FRICKE.